United States Patent Office 3,586,648
Patented June 22, 1971

3,586,648
FLEXIBLE AND HYDROPHILIC POLYURETHANE FOAM AND A METHOD OF MAKING SAME
Joerg Sambeth and Alexis Archipoff, Carouge, Geneva, Switzerland, assignors to Elekal, Paris, France
No Drawing. Filed Nov. 12, 1968, Ser. No. 775,179
Claims priority, application Switzerland, Nov. 13, 1967, 15,922/67
Int. Cl. C08g 22/46, 53/08, 53/20
U.S. Cl. 260—2.5                    10 Claims

ABSTRACT OF THE DISCLOSURE

To the usual compounds involved in making a flexible open-cell polyurethane foam by the so-called "one-shot" method there are added, from 5 to 30% by weight, in relation to the amount of polyol that is used, at least one water insoluble carboxymethyl cellulose or a water soluble carboxymethyl cellulose salt able to produce, by cation exchange during or after formation of the foam, an insoluble salt, to thereby produce a polyurethane foam having improved hydrophilic properties.

DISCLOSURE

This invention relates to flexible polyurethane foam, and to a method of making the same.

Flexible polyurethane foams are known, and an important application for these foams is as sponges, in particular for household and cleaning purposes. However, their water absorption properties are generally inadequate to render their use truly satisfactory as sponges.

An object of the present invention is therefore to provide a polyurethane foam which is not only flexible, but which also has good hydrophilic properties.

The invention provides, according to one aspect thereof, a flexible and hydrophilic polyurethane foam which consists of the reaction product of at least one polyether or polyester based polyol with at least one organic polyisocyanate in the presence of water, at least one fatty acid salt of divalent tin, at least one tertiary amine and at least one surface active agent, and wherein it includes a quantity ranging from 5 to 30% by weight of the polyol of at least one water insoluble carboxymethyl cellulose salt.

The invention also provides, according to a further aspect thereof, a method of making a flexible and hydrophilic polyurethane foam which comprises reacting in one hot a least one polyether or polyester based polyol at ambient temperature with at least one organic polyisocyanate in the presence of water, at least one fatty acid salt of divalent tin, at least one tertiary amine and at least one surface active agent, wherein there is incorporated in the reaction medium a quantity ranging from 5 to 30% by weight of the polyol of at least one water insoluble carboxymethyl cellulose salt.

The method according to the present invention, which is of the "one-shot" kind, thus consists in admixing with the starting substances used in making polyurethane foams by this "one-shot" method a sufficient quantity of carboxymethyl cellulose salt in order to substantially improve the capacity for water absorption of the thus produced foam, compared to that of foams made in the same way but without incorporating carboxymethyl cellulose salt.

In the remainder of the specification, the abbreviation CMC will be used for "carboxymethyl cellulose."

Use is made of the same polyester or polyether based polyols as those used in making flexible polyurethane foams by the known methods. However, it is preferred to use polyether based polyols to produce a foam having the best possible resistance to hydrolysis.

By way of polyester based polyol, use is made of the reaction products of at least one polyalcohol with at least one organic polyacid, in particular an aliphatic polyacid. Said polyalcohol will be a diol, such as ethylene glycol, propylene glycol, trimethylene glycol, diethylene glycol, dipropylene glycol, 1,3-butanediol, 1,4-butanediol or a polyalcohol containing more than two hydroxyl groups such as glycerine, sorbitol, pentaerythritol and inositol.

By way of polyether based polyol, use is made for instance of diols, such as polypropylene glycol, or triols or polyols having more than three hydroxyl functional groups, produced by adding propylene oxide molecules or ethylene oxide molecules and propylene oxide molecules to compounds having active hydrogen atoms such as the polyalcohols and the polyamines.

The preferred organic polyisocyanates are those employed in the known methods of making flexible polyurethane foams and in particular the following polyisocyanates: 2,4- and 2,6-tolylene diisocyanates, 1,4- and 1,5-naphthylene diisocyanate, 4,4'-diphenylmethane diisocyanate, paraphenylene diisocyanate, hexamethylene diisocyanate, dimeric 2,4-tolylene diisocyanate, 1,4-cyclohexane diisocyanate 4,4',4''-triphenylmethane triisocyanate and polymethylene polyphenylisocyanate comprising from 3 to 5 benzene rings. A mixture of said polyisocyanates can also be used.

By way of CMC salt, use is made of either an alkaline salt or a salt which is insoluble in water.

In the case of an alkaline salt, the preferences is for the sodium salt. Thus, use can, for example, be made of one of the products known in the trade as Ekacelle and Tylose, which consist of sodium salt of carboxymethyl cellulose having a degree of substitution of about 0.7 and which have the appearance of fine powders. The alkaline CMC salt is incorporated in the reaction medium by energetically stirring the mixture consisting of this substance, preferably used in the form of a fine powder, and of the other starting products for making the foam. It is of advantage, in order to achieve improved homogeneity of the reaction medium, and, consequently, of the resulting foam, to first mix the alkaline CMC salt with the polyol and then to add the catalysts and the surface active agent to the mixture so produced, this latter operation being carried out just before causing all of these substances to react with the water and the polyisocyanate or else at the same time as this reaction is made to take place.

In order to achieve a homogeneous mixture of the powdered alkaline CMC salt and of the other substances, the particles of this powder preferably have a size less than 0.2 mm.

It is also preferred to fully dry this powdered alkaline CMC salt before use, so that the amount thereof and the amount of water which are made to react can be determined with accuracy. The powder can be dried by keeping it for a few hours in an airless container, e.g., a drier which also contains a highly water absorbing substance such as phosphorous pentoxide.

In the presence of alkaline CMC salt, the foam is formed under the usual conditions. In particular, the time that is needed for the foam to "rise" is the same as if this substance were not present.

The minimum quantity of alkaline CMC salt to be used is 5% because a lesser amount would not provide the foams with hydrophilic properties that are any better than those of foams made in identical manner but without incorporating any CMC salt.

The maximum quantity is 30% because above this proportion the resulting mixture would be too viscous to be able to produce a foam having the desired properties.

By impregnating the resulting foams at ambient temperature for a period of, for example, 30 seconds with an aqueous solution of a metal salt having a valency of two or more, and subsequently by wringing these foams and rinsing them in clear water, they acquire a particularly soft and pleasant feel and the stability of their hydrophilic properties is moreover improved.

As regards this latter treatment, the best results were achieved by using aluminum nitrate, copper sulphate, ferric chloride and lead nitrate in the form of aqueous solutions containing 20% by weight of salt in relation to the total weight of the solution.

Hydrophilic foams having a pleasant feel and particularly lasting hydrophilic properties, can also be produced if at least one neutral salt of a metal having a valency of two or more is incorporated in the reaction medium at the same time as the alkaline CMC salt in a quantity slightly greater than the stoichiometric quantity of the alkaline salt.

By "neutral salt" is here meant a salt whose aqueous solutions have a pH of about 7. Acid salts would have a detrimental effect on the "rise" of the foam, i.e. on the formation of the cellular structure of this foam.

The best results were obtained with lead acetate. The incorporation of this neutral salt was carried out by intimately mixing this salt in finely powdered form with the powdered alkaline CMC salt and by then incorporating the resulting mixture in the reaction medium as indicated above.

By stoichiometric quantity of alkaline salt is meant the number of gram-equivalents of this salt. The amount of neutral salt that is mixed with the alkaline salt is so calculated that the number of gram-equivalents of the neutral salt may be slightly larger than the number of gram-equivalents of the alkaline salt. For example, one mole of lead acetate is used for two moles of alkaline salt. Thus, during the foam formation reaction, the sodium of the CMC salt is entirely substituted by lead thereby yielding an insoluble bivalent lead CMC salt instead of the alkaline salt which is soluble in water.

When a water insoluble salt is used by way of CMC salt, foams can be produced which are not only hydrophilic but which also have a pleasant feel and whose hydrophilic properties do not decrease substantially even after prolonged use as a wiping sponge.

By way of water insoluble CMC salt, use is made of a salt having a valency of at least two. The best results were obtained with salts of the following metals: aluminum, copper, iron (III) and lead (II).

The CMC salts of these metals are produced by being precipitated out of an aqueous solution of an alkaline CMC salt, e.g. sodium salt, by means of an aqueous solution of a water soluble salt of the relevant metal. The best results were obtained with any one of the following salts: aluminum nitrate, copper sulphate, ferric chloride and lead nitrate. Use is preferably made of an aqueous solution of alkaline CMC salt having a concentration of about 4% by weight which is mixed with the solution of the metal salt having a valency of two or more, the mixing being carried out, with advantage, by atomizing the first solution within the second. There is thus obtained a precipitate which is filtered, washed and dried. The resulting insoluble salt is then crushed to yield a fine powder preferably having a grain size of less 0.2 mm. This fine powder is incorporated in the reaction medium in the same way and in the same ratio as above in connection with the powdered alkaline salt. As when alkaline salt is used, it is preferred to dry as best as one can the powdered insoluble CMC salt before incorporating it in the reaction medium.

It is to be noted that, it all cases, the flexible and hydrophilic foams produced by the method according to the invention have a particularly pleasant feel and lasting hydrophilic properties when the CMC salt contained therein is an insoluble salt, this being true both when this salt is produced by reacting the alkaline salt with a metal salt having a valency of two or more during the making of the foam and when this reaction is effected after the foam has been made.

The following examples will help better to understand the way in which the method according to the invention is carried out and to set forth the advantages derived therefrom.

Example 1

A reference foam, containing no CMC salt, was made as follows:

By means of a rotationally agitating mixer having blades turning at 3500 r.p.m., an intimate mixture was prepared of the following substances, these being rapidly introduced, in the given order and proportions (these proportions being given by weight in relation to the weight of the polyol):

| | |
|---|---|
| Niax 14–16 (a polyether triol having an OH index of 46, made by Union Carbide) | 100 |
| SF 1066 Silicone oil (General Electric) | 2 |
| $A_1$ Catalyst (a tertiary amine made by Union Carbide) | 0.2 |
| Stannous octoate | 0.25 |
| Water | 3.5 |
| Tolylene diisocyanate (a mixture containing 80 mol percent of the 2,4 isomer and 20 mol percent of the 2,6 isomer) "TDI index" | 105 |

The "TDI index" or tolylene diisocyanate index is the ratio, expressed in percent, of the actual quantity of tolylene diisocyanate to the stoichiometric quantity of this compound, the quantities being expressed in moles. The stoichiometric quantity of tolylene diisocyanate is calculated from the total quantity of hydroxyl groups able to react with the isocyanate groups, i.e. the hydroxyl groups of the polyol and those of the water.

The total time taken by the mixing operation was about 30 seconds but stirring was only continued for 5 to 7 seconds after the introduction of the diisocyanate into the reaction medium. After that time, the mixture suddenly assumed a creamy appearance. Stirring was then stopped and the mixture was poured in one shot into a cardboard mold internally lined with paper.

A rapid foaming action took place which caused the foam to "rise" and to occupy the entire mold in less than one minute. The foam was then placed in an oven and kept at a temperature of 120° C. for one hour whereupon it was returned to ambient temperature and removed from the mold.

The resulting block of foam could readily be cut up into smaller pieces of desired shape and size, e.g. parallelipipedic pieces.

The capacity for water absorption of the foam was evaluated by measuring the "capillary absorption coefficient" as described in French Patent No. 1,284,015 (Rhône-Poulenc).

The capacity for water absorption of the foam was also evaluated in the following conventional way, termed "wiping efficiency measurement":

50 cc. of water was spread as uniformly as possible on a flat horizontal surface defined by a square measuring 50 x 50 cm. With a sponge made from the foam whose "wiping efficiency" is to be measured, which sponge had the shape of a parallelipipedic block of known weight and standard 14 x 9.5 x 5 cm. size, five wiping strokes were made in a direction parallel to one of the sides of the square in such a manner that the sponge was made to pass over the entire area of said square with one of its large faces, and then five further wiping strokes were made in a direction at right angles to the first direction with its other large face. The weight of the water picked up by the sponge was then worked out differentially. This weight, multiplied by the factor 2, gave the value of the wiping efficiency. This value represents the percentage in weight of water absorbed by the sponge in relation to the initial amount of water on the surface to be wiped.

The results that were obtained are given in the table.

Example 2

A foam containing 15% by weight of alkaline CMC salt, in relation to the polyol, was made as follows:

By stirring with the same mixer as in Example 1, there was prepared an intimate mixture of the following substances:

| | |
|---|---|
| Niax 14–46 | 100 |
| CMC sodium salt (Hercules 7MP) | 15 |
| SF 1066 silicone oil | 2 |
| $A_1$ catalyst | 0.2 |
| Stannous octoate | 0.2 |

The mixing of the above substances was carried out in two stages, the first consisting in mixing the polyol and the CMC sodium salt until a homogeneous mixture was obtained, this requiring a stirring time of about 30 seconds. The second stage of the mixing operation, which lasts about 15 seconds, took place after having added the silicone oil and the catalysts.

There were then added, in succession and without ceasing to stir the mixture, 3.5% of water, by weight in relation to the weight of polyol, and the same proportion of the same mixture of tolylene diisocyanate isomers as in Example 1 (TDI index=105). The procedure was then the same as in Example 1.

The capillary absorption coefficient and the wiping efficiency of the resulting foam were then measured as outlined in Example 1. The results that were obtained are found in the table.

Example 3

A block of foam made as set forth in Example 2 was impregnated with an aqueous solution containing 20% by weight of aluminum nitrate by soaking it for 30 seconds, at ambient temperature, in a bath consisting of this solution and by squeezing it several times in the bath, whereupon it was wrung and rinsed in clear water. The foam after having been treated in this manner had a feel which was far more soft and pleasant than that made according to Example 2.

The wiping efficiency and the capillary absorption coefficient were then measured. The results appear in the table.

Example 4

A block of foam made as in Example 2 but with 20% by weight, in relation to the polyol, of CMC sodium salt was treated in the same way as in Example 3 but with a solution containing 20% by weight of lead nitrate.

Example 5

A block of foam made as in Example 2 but with 10% by weight of CMC sodium salt was treated using the same procedure as in Example 4 but with a solution containing 20% by weight of ferric chloride.

Example 6

The procedure was the same as in Example 5 but using, for treatment purposes, a block of foam made with 20% by weight of CMC sodium salt.

Example 7

The same foam was used as in Example 5 but for the treatment use was made of a solution containing 20% by weight of copper sulphate.

Example 8

The same foam was used as in Example 6 but for the treatment use was made of a solution containing 20% by weight of copper sulphate.

Example 9

A foam was made as in Example 2 but with 10% by weight (in relation to the polyol) of CMC sodium salt and 8% by weight (in relation to the polyol) of lead acetate, the acetate being intimately mixed, in powder form, with the CMC sodium salt and the resulting mixture being incorporated in the reaction medium as if the CMC sodium salt were alone. The amount of stannous octoate was 0.25% by weight in relation to the polyol.

The resulting foam was both hydrophilic and pleasant to the touch.

Example 10

A foam was made as in Example 2 but using, instead of CMC sodium salt, 10% by weight, in relation to the polyol, of an insoluble salt produced as follows:

An aqueous solution containing 4% by weight of alkaline CMC salt was fed in atomized form into an aqueous solution containing 20% by weight of ferric chloride. This instantaneously produced a brown precipitate which was filtered, washed and then dried in an oven for 6 hours at a temperature of 120° C. This precipitate was then ground to a powder having a particle size less than 0.2 mm., and dried by enclosing it for 12 hours in a vacuum desiccator containing $P_2O_5$.

The stannous octoate that was used amounted to 0.3% by weight in relation to the polyol.

The resulting foam was hydrophilic and had a pleasant feel.

Example 11

The procedure was the same as in Example 10 but using 20% by weight of insoluble salt.

Example 12

The procedure was the same as in Example 10, but the insoluble salt was obtained by means of a solution containing 20% by weight of aluminum nitrate. Use was made of 10% by weight of this insoluble salt and the amount of stannous octoate employed was 0.25% by weight in relation to the polyol.

Example 13

As in Example 12 but using 20% by weight of insoluble salt.

The following table sets out the proportions of the substances in the mixtures used in making foams in accordance with the preceding examples and also the values for the capillary absorption coefficient, the wiping efficiency and the mechanical strength of these foams when wet.

| Ex. No. | Kind of CMC salt | Weight of— CMC salt [1] | Weight of— Al catalyst [1] | Weight of— Stannous octoate [1] | Capillary adsorption coefficient | Wiping efficiency | Mechanical strength when wet (g./cm.[2]) | Remarks |
|---|---|---|---|---|---|---|---|---|
| 1 | No CMC salt [2] | 0 | 0.2 | 0.25 | 65.8 | 81 | 600 | |
| 2 | Sodium salt | 15 | 0.2 | 0.2 | 99.2 | 87.7 | | |
| 3 | do | 15 | 0.2 | 0.2 | 88.1 | 88.2 | | Foam according to Ex. 2 10′ treatment in 20% solution of Al (NO$_3$)$_3$. |
| 4 | do | 20 | 0.2 | 0.2 | 69.1 | 87.5 | | 10′ treatment in 20% solution of Pb (NO$_3$)$_2$. |
| 5 | do | 10 | 0.2 | 0.2 | 86.6 | 86 | | 10′ treatment in 20% solution of FeCl$_3$ |
| 6 | do | 20 | 0.2 | 0.2 | 107.2 | 88 | | Do. |
| 7 | do | 10 | 0.2 | 0.2 | 97.3 | 84 | | 10′ treatment in 20% solution of CuSO$_4$. |
| 8 | do | 20 | 0.2 | 0.2 | 88.9 | 82.5 | | Do. |
| 9 | Sodium salt plus (CH$_3$COO)$_2$Pb | 10 | 0.2 | 0.25 | 68.5 | 85 | 250 | Addition, to 1 part by weight of sodium salt, of 0.8 part by weight of lead acetate. |
| 10 | Insoluble salt [3] | 10 | 0.2 | 0.3 | 81.1 | 82.5 | 660 | |
| 11 | do | 20 | 0.2 | 0.3 | 84 | 83 | 660 | |
| 12 | Insoluble salt [4] | 10 | 0.2 | 0.25 | 89.9 | 84 | 580 | |
| 13 | do.[4] | 20 | 0.2 | 0.25 | 70.4 | 82.5 | 750 | |

[1] Percent in relation to polyol.
[2] Reference foam.
[3] Na salt plus FeCl$_3$.
[4] Na salt plus Al(NO$_3$)$_3$.

We claim:

1. A flexible and hydrophilic polyurethane foam which consists of the reaction product of at least one polyether or polyester based polyol with at least one organic polyisocyanate in the presence of water, of at least one fatty acid salt of divalent tin, of at least one tertiary amine and of at least one surface active agent, and wherein said reaction product includes a quantity ranging from 5 to 30% based on the weight of the polyol of at least one water insoluble carboxymethyl cellulose salt of at least one metal having a valency of at least two.

2. A polyurethane foam as claimed in claim 1, wherein said salt is a salt of at least one of the following metals: aluminum, copper, iron (III) and lead (II).

3. A method of making a flexible and hydrophilic polyurethane foam which comprises reacting in one shot at least one polyether or polyester based polyol at ambient temperature with at least one organic polyisocyanate in the presence of water, at least one fatty acid salt of divalent tin, at least one tertiary amine and at least one surface active agent, wherein there is incorporated in the reaction mixture a quantity ranging from 5 to 30% based on the weight of the polyol, of at least one alkaline salt of carboxymethyl cellulose and wherein the foam, once formed, is impregnated with an aqueous solution of at least one metal salt selected from aluminum nitrate, copper sulphate, ferric chloride, and lead nitrate, and is then wrung and rinsed in clear water, to thereby impart a soft and pleasant feel to the foam.

4. A method as claimed in claim 3, wherein the alkaline carboxymethyl cellulose salt is the sodium salt.

5. A method of making a flexible and hydrophilic polyurethane foam which comprises reacting in one shot at least one polyether or polyester based polyol at ambient temperature with at least one organic polyisocyanate in the presence of water, at least one fatty acid salt of divalent tin, at least one tertiary amine and at least one surface active agent, wherein there is simultaneously incorporated in the reaction mixture a quantity ranging from 5 to 30% based on the weight of the polyol, of at least one alkaline carboxymethyl cellulose salt and at least one neutral salt of a metal having a valency of at least two in a quantity slightly greater than the stoichiometric quantity of the alkaline salt.

6. A method as claimed in claim 5 wherein the alkaline carboxymethyl cellulose salt is the sodium salt.

7. A method as claimed in claim 5, wherein said neutral salt is lead acetate.

8. A method of making a flexible and hydrophilic polyurethane foam which comprises reacting in one shot at least one polyether or polyester based polyol at ambient temperature with at least one organic polyisocyanate in the presence of water, at least one fatty acid salt of divalent tin, at least one tertiary amine and at least one surface active agent, wherein there is incorporated in the reaction mixture a quantity ranging from 5 to 30%, based on the weight of the polyol, of a water insoluble salt of carboxymethyl cellulose selected from the salts of the following metals: aluminum, copper, iron (III), and lead (II).

9. A method as claimed in claim 8, wherein said salt is obtained by precipitation from an aqueous solution of an alkaline carboxymethyl cellulose salt by means of an aqueous solution of at least one metal salt having a valency of two or more.

10. A method as claimed in claim 9, wherein said metal salt having a valency of two or more is selected from the group consisting of aluminum nitrate, copper sulphate, ferric chloride and lead nitrate.

References Cited

UNITED STATES PATENTS

| | | | |
|---|---|---|---|
| 2,389,761 | 11/1945 | Burgani | 215—40 |
| 2,697,048 | 12/1954 | Secrist | 117—140 |
| 3,326,823 | 6/1967 | Landler et al. | 260—2.5 |

OTHER REFERENCES

Condensed Chemical Dictionary 5th ed., Reinhold, New York (1956) p. 997.

DONALD E. CZAJA, Primary Examiner

H. S. COCKERAM, Assistant Examiner

U.S. Cl. X.R.

106—197; 117—98, 138.8; 260—18, 231